United States Patent
Odaira et al.

(10) Patent No.: US 10,203,520 B2
(45) Date of Patent: Feb. 12, 2019

(54) PROGRESSIVE POWER LENS GROUP

(71) Applicant: HOYA LENS THAILAND LTD., Thanyaburi, Patumthani (TH)

(72) Inventors: Tomohiro Odaira, Tokyo (JP); Yasunori Izawa, Tokyo (JP)

(73) Assignee: HOYA LENS THAILAND LTD., Patumthani (TH)

( * ) Notice: Subject to any disclaimer, the term of this patent is extended or adjusted under 35 U.S.C. 154(b) by 14 days.

(21) Appl. No.: 15/513,366

(22) PCT Filed: Sep. 24, 2015

(86) PCT No.: PCT/JP2015/076986
§ 371 (c)(1),
(2) Date: Mar. 22, 2017

(87) PCT Pub. No.: WO2016/047713
PCT Pub. Date: Mar. 31, 2016

(65) Prior Publication Data
US 2017/0299889 A1 Oct. 19, 2017

(30) Foreign Application Priority Data
Sep. 22, 2014 (JP) ................................. 2014-192242

(51) Int. Cl.
*G02C 7/02* (2006.01)
*G02C 7/06* (2006.01)

(52) U.S. Cl.
CPC ............. *G02C 7/028* (2013.01); *G02C 7/027* (2013.01); *G02C 7/06* (2013.01); *G02C 7/065* (2013.01); *G02C 2202/08* (2013.01)

(58) Field of Classification Search
CPC .................................. G02C 7/028; G02C 7/06
(Continued)

(56) References Cited

U.S. PATENT DOCUMENTS

| 8,506,074 B2 | 8/2013 | Gerbaud |
| 2005/0088616 A1 | 4/2005 | Nason et al. |

(Continued)

FOREIGN PATENT DOCUMENTS

| EP | 1 950 601 A1 | 7/2008 |
| EP | 2 224 276 A1 | 9/2010 |

(Continued)

OTHER PUBLICATIONS

Mar. 28, 2017 International Preliminary Report on Patentability issued with International Patent Application No. PCT/JP2015/076986.

(Continued)

*Primary Examiner* — Tuyen Tra
(74) *Attorney, Agent, or Firm* — Oliff PLC

(57) ABSTRACT

A progressive power lens group includes a plurality of progressive power lenses including a near region for seeing an object at a near distance, a specific region for seeing an object at a far distance in relation to the near distance, and an intermediate region provided as a region between the specific region and the near region and having a power progressing from the specific region toward the near region, in which a near power at the near region is common in the plurality of progressive power lenses and a power corresponding to a predetermined common target distance which is a distance between the near distance and the far distance is provided at a predetermined part of the intermediate region.

5 Claims, 5 Drawing Sheets

(58) Field of Classification Search
USPC .................... 351/159.42, 159.41, 159.01, 41
See application file for complete search history.

(56) References Cited

U.S. PATENT DOCUMENTS

2006/0203193 A1   9/2006   Kato
2009/0290125 A1   11/2009  Varnas et al.

FOREIGN PATENT DOCUMENTS

| EP | 2 450 738 A1 | 5/2012 |
| JP | 2006-285200 A | 10/2006 |
| JP | 2007-148458 A | 6/2007 |
| JP | 2008-541142 A | 11/2008 |
| JP | 2014-085575 A | 5/2014 |
| WO | 2014/133167 A1 | 9/2014 |

OTHER PUBLICATIONS

Nov. 24, 2015 International Search Report issued in International Patent Application No. PCT/JP2015/076986.
May 4, 2018 Search Report issued in European Patent Application No. 15844186.5.

PROGRESSIVE POWER LENS GROUP

TECHNICAL FIELD

The present invention relates to a progressive power lens group.

BACKGROUND ART

A progressive power lens (hereinafter, simply referred to as a "lens") which includes a distance region with a distance power for seeing an object at a far distance, a near region with a near power for seeing an object at a near distance, and an intermediate region provided as a region between the above-described two vision regions and having a power progressing from the distance region toward the near region is known.

Since the power at the intermediate region progresses, astigmatism easily occurs. The astigmatism causes jumping and warping when a wearer sees an object. Therefore, there have been efforts to ensure a comfortable visual field by reducing this astigmatism as much as possible.

For example, as illustrated in Patent Literature 1, a countermeasure which intentionally adds a power to a distance region is known. By employing this countermeasure, it is possible to suppress a power increase degree from the distance region toward the near region and thus to reduce astigmatism. In this way, a lens maker can provide a comfortable visual field for a wearer wearing a lens.

CITATION LIST

Patent Literature

Patent Literature 1: U.S. Pat. No. 8,506,074

SUMMARY OF INVENTION

Technical Problem

In the progressive power lens, there are many cases in which the power change state at the intermediate region is different. Then, the lens optimal for the wearer is very different. In addition, even when the lens optimal for the wearer is manufactured, a position on the lens when the wearer sees a computer changes from the previous lens if the wearer replaces the previous lens by a new lens.

Besides, as an example in which the power change state at the intermediate region is different, there is a variation in the power which is intentionally added to the distance region without changing the near power in the method described in Patent Literature 1.

In the above-described cases, since a position on the lens for seeing an intermediate distance optimal for the wearer changes even at the same near power, the wearer needs to make an effort of taking an unnecessary body motion such that a face direction is changed or a body is inclined forward and backward in order to allow a line of sight to pass through a part having a power suitable for the intermediate distance. That is, since there is a different design variation or a replacement of the lens, a comfortable posture is not guaranteed.

An object of the invention is to provide a progressive power lens group which gives a comfortable posture to an individual when a different lens in the same lens group is selected.

Solution to Problem

According to a first aspect of the invention, there is provided a progressive power lens group including:
a plurality of progressive power lenses including
a near region for seeing an object at a near distance,
a specific region for seeing an object at a far distance in relation to the near distance, and
an intermediate region provided as a region between the specific region and the near region and having a power progressing from the specific region toward the near region, wherein
a near power at the near region is common in the progressive power lens group, and
a power corresponding to a predetermined target distance which is a distance between the near distance and the far distance is provided at a predetermined common part of the intermediate region.

According to a second aspect of the invention, there is provided the progressive power lens group of the first aspect further including:
a lens which has a different power at the specific region.

According to a third aspect of the invention, there is provided the progressive power lens group of the first or second aspect, wherein
in at least one of the plurality of progressive power lenses, a power exceeding zero is added to a prescription power of the specific region so that a power corresponding to a predetermined target distance which is a distance between the near distance and the far distance is provided at a predetermined part of the intermediate region.

According to a fourth aspect of the invention, there is provided the progressive power lens group of the third aspect, wherein
the power (ADD(F)) added to a prescription power is expressed by the following formulae:

$$ADD(F) = (ADD(target) - \beta * ADD)/(1-\beta)$$

$$ADD(target) = D(target) - ACC * ACCratio$$

where
ADD denotes an addition power (a prescription power) of the progressive power lens,
D(target) denotes a power corresponding to a target distance,
ADD(target) denotes an additional power for the prescription power provided at the predetermined part of the intermediate region and is obtained by subtracting an adjustment amount necessary for a wearer to see an object at the target distance from D(target),
$\beta$ denotes an addition ratio of the predetermined part of the intermediate region before the addition of ADD(F),
ACC denotes an accommodative power of the wearer or a fixed value obtained in consideration of the accommodative power, and
ACCratio denotes a ratio used for the wearer to see the object at the target distance in the accommodative power of the wearer.

Advantageous Effects of Invention

According to the invention, it is possible to provide a progressive power lens group which gives a comfortable posture to an individual when a different lens in the same lens group is selected.

MODE FOR CARRYING OUT THE INVENTION

First Embodiment

Hereinafter, an embodiment will be described according to the following order.
1. Basic Structure of Progressive power lens Group and Progressive power lens thereof
2. Method of Designing (Manufacturing) Progressive power lens
  2-1. Base Design Selecting Step
  2-2. Target Distance Determining Step
  2-3. Specific Region Additional power Determining Step
3. Effect of Embodiment
4. Modified Example Further, in [Second Embodiment], a method of determining a power added to a specific region in consideration of the accommodative power of eyes of a wearer will be described.

Further, in the specification, the "addition power" and the "power added to the specific region (hereinafter, simply referred to as an "additional power")" are completely different from each other. This will naturally become clear as we go through the specification.

<1. Basic Structure of Progressive Power Lens Group and Progressive Power Lens Thereof>

The embodiment relates to a progressive power lens group. The "progressive power lens group" literally indicates a plurality of sets of progressive power lenses and also indicates a series of progressive power lenses in other words.

The lens group may be a series of lenses manufactured based on the same design concept. Here, the design concept is, for example, a design which helps a wearer to comfortably see an object at a desired position on a lens even when the lens changes, for example, when the wearer sees an object at a highly frequent use distance.

In this item, a basic structure of a progressive power lens group and a progressive power lens thereof will be described.

Figure 1A:
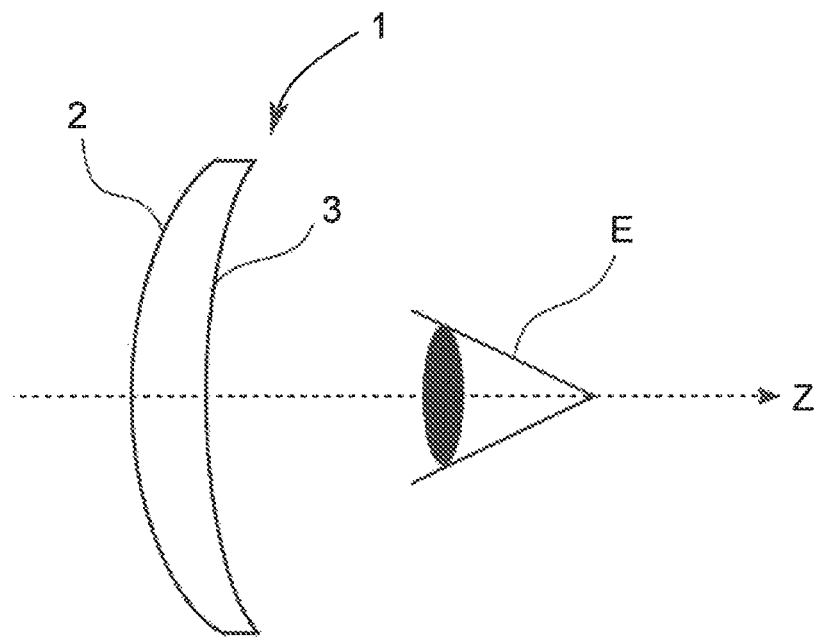
FIG. 1A is a schematic cross-sectional view of a progressive power lens according to an embodiment.
Figure 1B:
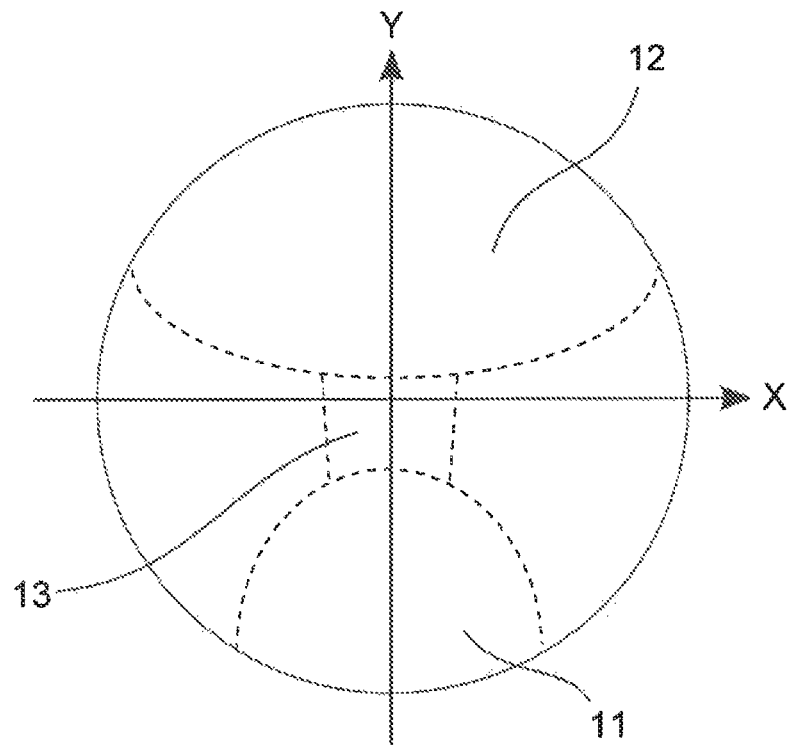
FIG. 1B is a diagram illustrating an example of an arrangement of a near region, a specific region, and an intermediate region of the progressive power lens according to the embodiment.

As illustrated in FIG. 1A, a progressive power lens 1 which constitutes a lens group of the embodiment is a lens which is obtained by the combination of a surface (which is an object side surface 2 and will be simply referred to as an "outer surface") which is located near an object and a surface (which is an eyeball side surface 3 and will be simply referred to as an "inner surface") which is located near an eyeball E.

Further, in order to help the description of the embodiment, a case (a so-called inner surface progressive lens) in which the outer surface 2 is a spherical surface or a toric surface and the inner surface 3 is a progressive surface will be exemplified. The progressive surface of the embodiment has the following configuration.

That is, in the inner surface 3, a near region 11 for seeing a near distance (for example, 40 cm to 60 cm) is disposed at a bottom side (hereinafter, simply referred to as a "downside") in a top and bottom direction of the lens 1 when the wearer wears the lens 1.

Meanwhile, in the embodiment, a specific region 12 for seeing an object at a far distance in relation to the near distance is disposed at an upside of the near region 11. The specific region 12 of the embodiment is not particularly limited and may be dedicated for a far distance (for example, 2 m to the infinity) or an intermediate distance (for example, 60 cm to 200 cm). Further, the specific regions 12 of the lenses constituting the lens group may be disposed at the same or different positions of the lenses.

In the embodiment, a case in which the specific region 12 is an intermediate region will be exemplified.

Additionally, a near measurement reference point for measuring a reference power is set for the near region 11. Similarly, the same measurement reference point is also set for the specific region 12.

Moreover, the lens 1 of the embodiment includes an intermediate region 13 which is a region between the specific region 12 and the near region 11 and in which the power progresses from the specific region 12 toward the near region 11. Additionally, the intermediate region 13 may be referred to as a progressive region.

Here, the lens group of the embodiment has major features in structure based on the following common technical concept. The features are as follows.

(Feature 1)

The progressive power lenses 1 are formed to have a common near power at the near region 11. For example, the same near power is set to the same positions of the near regions 11 of the lenses constituting the lens group. The point having the same near power may be set to a different position of the near region 11 in each of the lenses. Further, the near regions 11 of the lenses may be set to the same or different positions of the lenses.

(Feature 2)

The power corresponding to a predetermined limited common target distance which is a distance between a near distance (a distance for the near region 11) and a far distance (a distance for the specific region 12) is provided at a predetermined part of the intermediate region 13. Additionally, in the embodiment, a predetermined part of each lens is located at the same position even when the lens is different.

Regarding (Feature 1), the following circumstances are assumed. That is, the prescription power which is set to the lens 1 constituting the lens group is usually provided so that a spherical power and an addition power for a specific distance (a far distance or an intermediate distance) are set. Hereinafter, the addition power which is a prescription value will be referred to as the addition power (the prescription value). That is, the near power which is obtained by the combination of the spherical power and the addition power (the prescription value) cannot be changed by a maker of the lens 1. For that reason, a condition of setting the "common near power" in the lens group is needed. Additionally, the contents of obtaining the "common near power" include a case where the near power is completely the same among the lenses 1 and a case where a slight difference occurs at a level not causing any problem despite a slight difference in near power.

Regarding (Feature 2), although the contents have been mentioned as described above, a lens optimal for the wearer is very different for the wearer and the lens 1 optimal for each of the wearers needs to be promptly provided.

The following effects are obtained by (Feature 2). That is, since all lenses 1 included in the lens group are formed to have the common target distance, a common power is inevitably obtained at a specific position corresponding to the target distance inside the intermediate region 13 of each lens 1. For that reason, even when the wearer replaces (that is, switches) the lens 1 (for example, a lens A) included in a series of lenses by a different lens B, the appearance at a specific position inside the intermediate region 13 corresponding to the target distance does not change. That is, if the wearer uses a lens included in the lens group according to the embodiment, there is no need to change a posture before a lens selected from the lens group of the embodiment is used, for example, during an operation using a computer (that is, an operation performed while seeing an object at a predetermined distance) as long as a different lens 1 is selected from the same lens group. Accordingly, it is possible to perform an operation in a comfortable posture.

In addition, there is also an effect obtained by the combination of (Feature 1) and (Feature 2). (Feature 1) and (Feature 2) respectively indicate a regulation of obtaining a common near power and a regulation of obtaining a common power at a specific position inside the intermediate region 13 corresponding to the target distance in the lens group. In other words, these regulations mean that a degree of freedom is given in addition to the above-described two powers. Thus, the lens group according to the embodiment can be configured by any one of a perspective lens, an occupational lens, and a close-up lens or a combination thereof. In other words, the specific region 12 can be freely set to a distance region, an intermediate distance region, or a near distance region which is slightly distant from the wearer compared to a distance of a near region and is close to the wearer.

Figure 4:
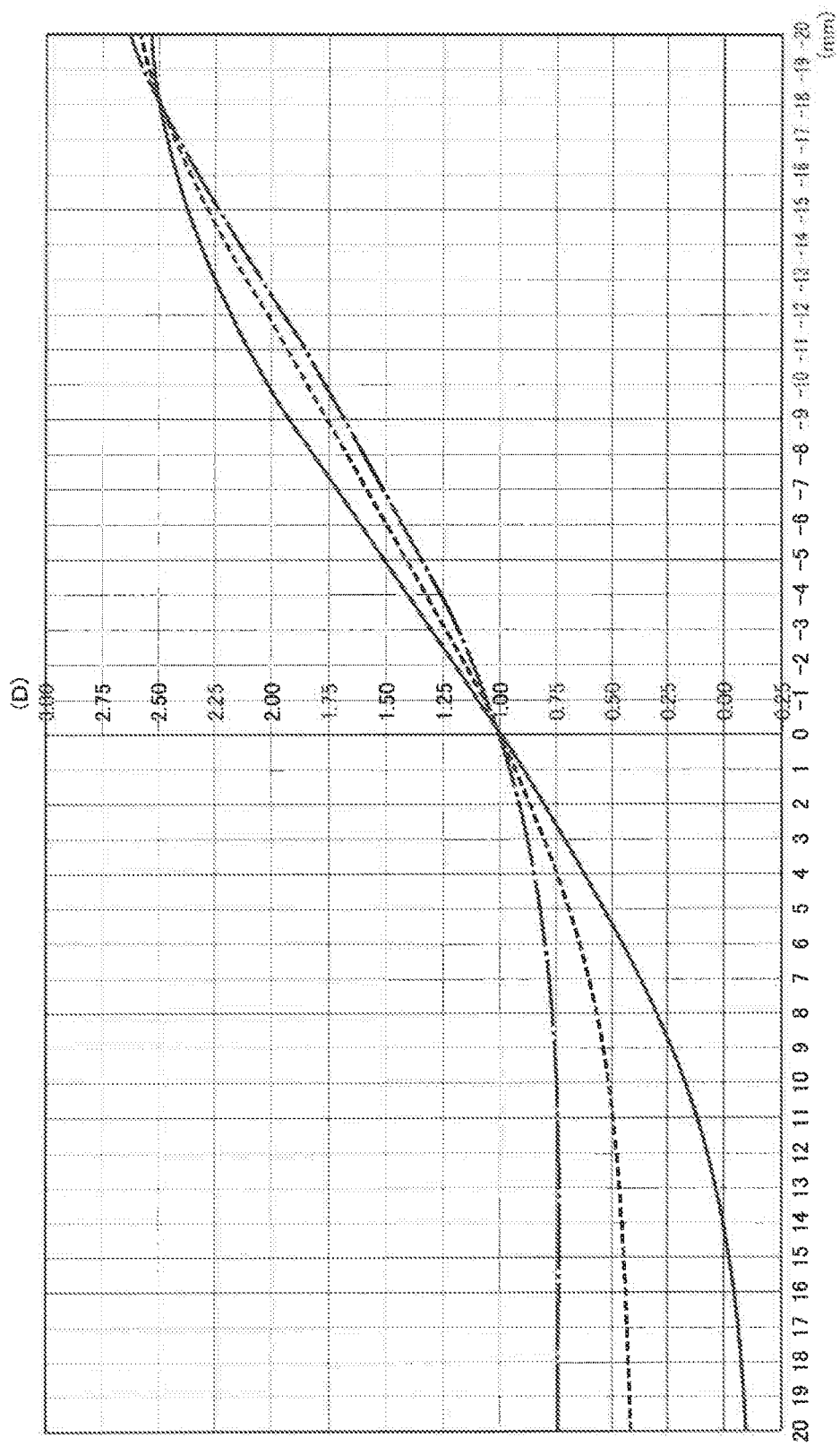
FIG. 4 is a graph illustrating a relation between a distance on a main line of sight and an actual power in each of progressive power lenses constituting a progressive power lens group according to the first embodiment.

As still another preferable feature, a method of adding a power exceeding zero to the specific region 12 can be employed as a method in which at least one of the lens group is provided so that a power corresponding to the target distance is provided at a predetermined part of the intermediate region 13 in common with (Feature 1) and (Feature 2). The state is depicted in FIG. 4 and FIG. 4 will be described later.

Hereinafter, a detail of the above-described contents will be described as a method of designing (manufacturing) the progressive power lens 1 along with the circumstances leading to this embodiment.

<2. Method of Designing (Manufacturing) Progressive Power Lens 1>

First, the circumstances leading to this embodiment are as follows.

As described above, when a power is added to the distance region as in Patent Literature 1, astigmatism is reduced and thus a comfortable visual field can be obtained. Incidentally, when a position on the lens for seeing an intermediate distance optimal for the wearer is changed even at the same near power, the wearer needs to make an effort of taking an unnecessary body motion such that a face direction is changed or a body is inclined forward and backward so as to allow a light of sight to pass through a part having a power suitable for the intermediate distance. That is, since there is a different design variation or a replacement of the lens, a comfortable posture is not guaranteed.

As a result of a careful examination of the present inventor, it was found that an original problem of the wearer wearing the progressive power lens could not be solved only from the viewpoint of the comfortable visual field. Specifically, there is a need to solve this problem from the viewpoint that the wearer has to perform an operation in a comfortable posture instead of the viewpoint of the comfortable visual field.

Hereinafter, the case that became the base from which the above findings were obtained is described.

First, a fitting point which helps the wearer to see the infinity is set in a conventional perspective lens capable of handling a far distance and a near distance.

Currently, there is known an occupational lens suitable for seeing a distance at hand (a near distance) and suitable for a distance (an intermediate distance) for seeing a computer. In addition, the fitting point is also set in the occupational lens. In this case, the fitting point indicates a part on the lens through which a line of sight when the wearer sees the infinity passes.

However, in a case where the fitting point is set in the occupational lens, a design in which a power corresponding to the intermediate distance is provided at the fitting point for seeing the infinity has been employed from the past. The present inventor has found that such a conventional design cannot give a comfortable posture to the wearer.

Specifically, when the wearer operates a computer while wearing the occupational lens, the wearer moves a line of sight downward from the fitting point. Although the power suitable for the intermediate distance is set at the fitting point, the wearer actually sees a part below the fitting point. Accordingly, the wearer performs an operation while his/her line of sight passes through a part having a power different from the power suitable for the intermediate distance. Thus, the wearer usually tries to obtain a comfortable visual field by changing an ordinary body posture. As a result, a body posture, that is, a comfortable posture during an operation is changed. In this circumstance, it is difficult to mention that the lens is comfortably used. Finally, the present inventor has noticed for the first time that a lens capable of giving an ordinary body posture, that is, a "comfortable posture" to the wearer needed to be provided.

In addition to the problem to be solved by the invention, the present inventor has examined diligently a method of solving the above-described problems, that is, a method of giving a "comfortable posture" to "individuals". As a result, a method has been contrived which adds a further power to the distance power at the distance region 12 so that a power corresponding to a predetermined limited target distance is provided at a predetermined part (that is, a part which is used to see an object at the target distance in a comfortable posture and through which a line of sight when the wearer sees an object at the target distance passes) of the intermediate region 13 and sets the near power at the near region 11 to be the same before and after the addition of the power. A detail description thereof is the contents of the specification. Hereinafter, a method of designing (manufacturing) the progressive power lens 1 according to the embodiment will be described as a detailed example of the above-described contents.

(2-1. Base Design Selecting Step)

In this step, abase design of the lens 1 which is a design target is selected. The "base design" indicates a design relating to a variation in power on a main line of sight of the progressive power lens 1. Further, the "main line of sight" is a track of sight on the lens 1 when the sight of the wearer passes through the lens 1 in a direction from the upside toward the downside and is a line obtained by connecting points where the astigmatism becomes minimal on the horizontal lines of the lens 1 or the vicinities of the minimal astigmatism points. In other words, the main line of sight is a line which connects a measurement reference point at the specific region 12 and a measurement reference point at the near region 11.

Figure 2:
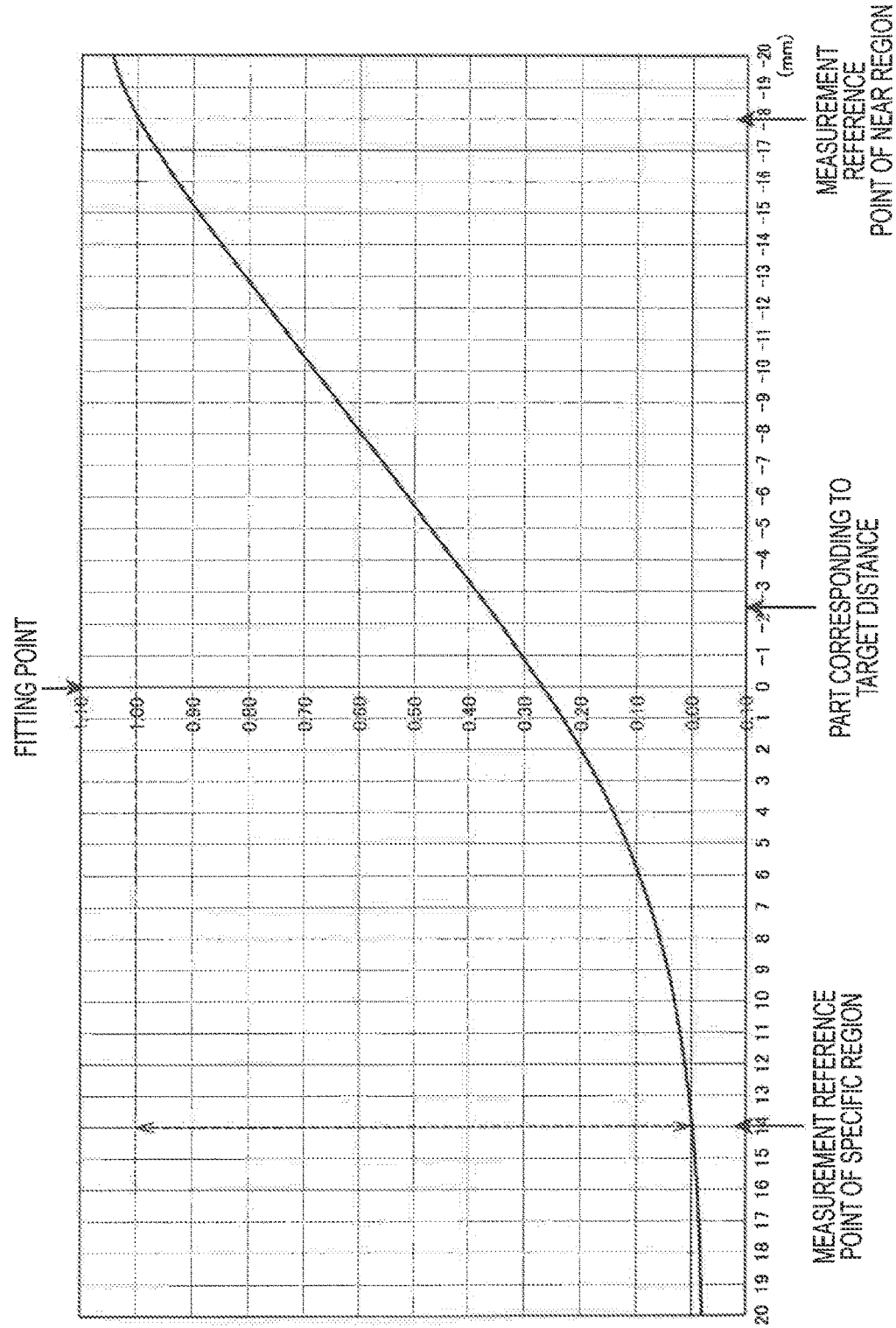
FIG. 2 is a graph illustrating a relation between a distance on a main line of sight and an addition power normalized to 0 and 1 in a normalization state set by a base design selecting step of a first embodiment.

Of course, since the power increases from the specific region 12 to the near region 11, the base design naturally changes when the specific region 12 having a power increase start point and the near region 11 having a power increase goal point are different in the plurality of lenses 1. For that reason, a design obtained by normalizing a variation in power on the main line of sight of the plurality of lenses 1 is used as the "base design". A detailed example is illustrated in FIG. 2. In addition, since a "variation in power" on the main line of sight is normalized even when the prescription power (for example the spherical power Sph) provided at the lens 1 is not zero, any particular problem does not arise.

Here, a selection of the base design largely depends on the wearer.

For example, in a case where the power increases from the specific region 12 toward the near region 11, the power suddenly increases at the specific region 12. Accordingly, a large astigmatism occurs and thus a visual field is easily distorted. However, since the power at the near region 11 gently increases, a satisfactory visual field can be obtained. In the case of the wearer who frequently uses the near region 11, it is desirable to employ this base design.

In contrast, in a case where the power does not substantially increase from the specific region 12 toward the near region 11, the power at the specific region 12 gently increases and thus a satisfactory visual field can be obtained. However, since the power at the near region 11 suddenly increases, a large astigmatism occurs and thus a visual field is easily distorted. In the case of the wearer who frequently uses the specific region 12 (the intermediate distance), it is desirable to employ this base design.

(2-2. Target Distance Determining Step)

Next, in this step, the target distance of the wearer is determined. The target distance is largely dependent on how the wearer uses glasses when wearing the lens 1 as glasses. For example, in a case where the wearer performs an operation while frequently using a computer, a distance from the eye of the wearer to the computer is set as the target distance and here is assumed as 80 cm. In addition, the target distance corresponds to a "predetermined target distance which is a distance between the near distance (a distance for the near region 11) and the far distance (a distance for the specific region 12)".

In this case, when the distance (about 80 cm) to the computer is converted into a diopter (D), a formula of 1/0.8 m=1.25 D is obtained. In a case where the finally obtained lens 1 is used by the wearer, 1.25 D needs to be ensured by the sum of the power of the lens and the adjustment amount necessary for the wearer to comfortably see the computer. Then, the "position of the lens 1 when the wearer sees the computer" corresponds to a "part which is a predetermined part of the intermediate region 13 and has a power corresponding to the target distance". In the case of this example, a position of 2.5 mm below the fitting point on the lens 1 becomes a "predetermined part of the intermediate region 13". In addition, when the target distance which is desired by the wearer is set, the predetermined part on the lens 1 may be determined in response to the wearer. For example, in a case where the wearer sees the computer, the predetermined part may be determined at one time such that the predetermined part is located at a position of 2.5 mm below the fitting point (in other words, a part different from the fitting point on the lens 1).

As for the above-described example, there is a need to ensure 1.25 D for the wearer at a position of 2.5 mm below the fitting point. The lens 1 can be simply designed in this way, but when the lens 1 is simply designed without any restriction, the design has a defect such that the addition power suddenly changes. Further, in a case where a power is added to obtain a "comfortable visual field", a design inevitably becomes complex when a power corresponding to the target distance is provided at a "predetermined part in the intermediate region 13" of the lens 1. From the viewpoint of the design and the manufacture as well as the lens 1 itself, there is a need to provide the lens 1 capable of obtaining a "comfortable visual field" while keeping an ordinary body posture, that is, a "comfortable posture" of the wearer.

Here, a "comfortable posture" of the invention indicates a posture when the wearer sees the intermediate distance at the most comfortable line of sight. At this time, it is ideal not to accompany an unnecessary displacement of a head or a body. As a detailed circumstance in which a comfortable posture is realized, for example, a case can be exemplified in which a single focus lens for a near region is selected or a spectacle lens accustomed to the wearer and not requiring an unnecessary effort is used regardless of the single focus lens or the progressive power lens.

In order to manufacture the lens 1 that meets the above-described needs, the following steps are performed.

(2-3. Step of Determining Power Added to Specific Region 12)

In this step, the power added to the specific region 12 is determined. Hereinafter, a description will be made using a sign of D( ) or ADD( ). A subscript is included in parentheses ( ).

A sign of D(target) in the specification indicates the power corresponding to the target distance. In other words, the sign of D(target) is merely a power value obtained by converting a distance into a diopter (diopter=1/distance (m)). In addition, the "power corresponding to the target distance" in the specification is merely a power value obtained by converting a distance into a diopter.

If the prescription power (the spherical power) is 2.0 D, a value obtained by adding 2.0 D to the sign of D(target) becomes the power which is an "absolute value" corresponding to the target distance.

Further, the sign of ADD( ) in the specification indicates how much the power increases from zero at a predetermined part on the lens 1 when the power at the measurement reference point in the specific region 12 is set to zero. That is, the sign of ADD( ) is a value which indicates an increase amount from the power of the measurement reference point in the specific region 12. In addition, the additional power calculating method does not change whether the prescription power is 2.0 D or zero. Meanwhile, the sign of ADD corresponding to the addition power (the prescription value) is marked without ( ).

Hereinafter, a case where the prescription power is zero will be described in order to simplify a description.

Figure 3:
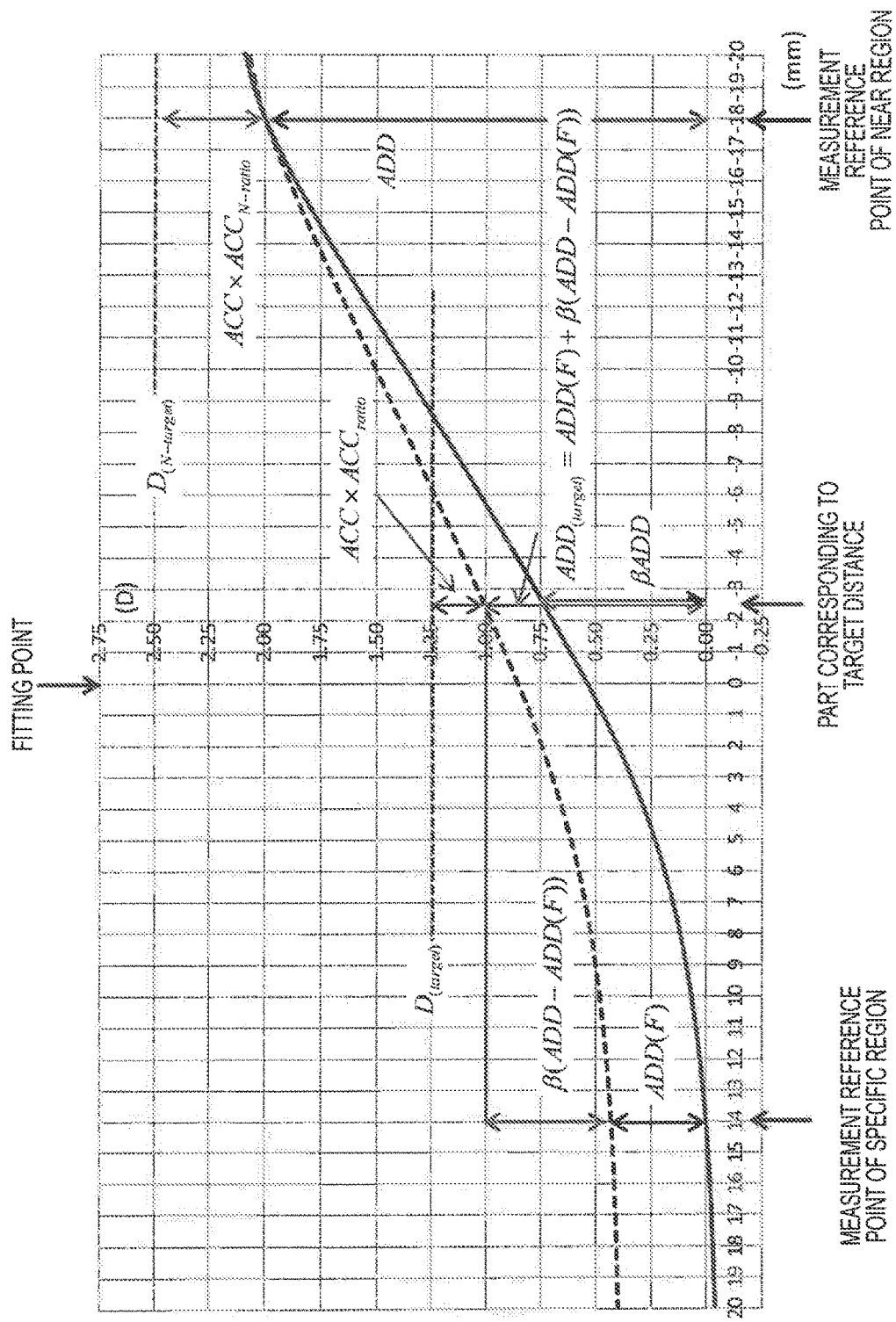
FIG. 3 is a graph illustrating a relation between a distance on a main line of sight and an actual power of the first embodiment, where a solid line indicates a lens before the addition of the power to the specific region and a broken line indicates a lens after the addition of the power to the specific region.

FIG. 3 is a graph illustrating a relation between an actual power and a distance on a main line of sight when ADD which is the addition power (the prescription value) is 2.0 D in the progressive power lens 1 having the base design of the occupational lens 1. Additionally, the target distance is set to 80 cm (=1.25 D) similarly to the above-described embodiment and a position (a predetermined part of the intermediate region 13) on the lens 1 corresponding to the target distance is set to a point of 2.5 mm below the fitting point. Further, a solid line indicates a lens before the addition of the power to the specific region 12 and a broken line indicates a lens after the addition of the power to the specific region 12.

Here, a method of determining ADD which is the addition power (the prescription value) of the lens 1 is examined before the power added to the specific region 12 is determined.

D(N-target) is a power corresponding to the near distance for the near region 11. Before ADD of the lens 1 is determined, an optometrist usually determines an ACCN-ratio to be used in the accommodative power ACC of the wearer. Since the ACCN-ratio is generally set to about ½ to ⅔ of the accommodative power of the wearer, the ACCN-ratio is set to 0.5 in the embodiment so that a half of the accommodative power ACC is used when the wearer sees an object at the near distance. Such a relation is expressed by (Formula 1).

$$\text{ADD}=D(N\text{-target})-\text{ACC}*\text{ACCN-ratio} \quad \text{(Formula 1)}$$

That is, the accommodative power ACC of the wearer is usually considered in the lens 1. In this way, since ADD can be suppressed to be low, the aberration occurring in the lens 1 can be reduced.

Hereinafter, the embodiment will be described on the basis of the above-described contents.

As illustrated in FIG. 3, D(target) at a position (a predetermined part of the intermediate region 13) on the lens 1 corresponding to the target distance and ADD(target) at the predetermined part of the lens 1 have the following relation.

$$D(\text{target})=\text{ADD}(\text{target})+\text{ACC}*\text{ACCratio} \quad \text{(Formula 2)}$$

When this formula is modified, the following formula is obtained.

$$\text{ADD}(\text{target})=D(\text{target})-\text{ACC}*\text{ACCratio} \quad \text{(Formula 3)}$$

ACCratio indicates a ratio of the accommodative power of the wearer to be used when the wearer sees an object at the target distance.

Meanwhile, a state before the addition of the additional power will be mainly described. FIG. 2 (which has been described above) is a graph illustrating a relation between the distance on the main line of sight and the addition power normalized to 0 to 1 in the normalized state in the base design selecting step.

Next, in the normalized graph (FIG. 2), the addition ratio at a "predetermined part on the lens 1" corresponding to the target distance determined in the target distance determining step is read. According to the above-described assumption, the addition ratio at a position of 2.5 mm below the fitting point becomes $\beta$ (here, 0.363).

That is, there is a need to perform a process of increasing the addition ratio $\beta$ (0.363) at a predetermined part (a position of 2.5 mm below the fitting point) on the lens 1 to the addition ratio necessary for a predetermined part on the lens 1 "finally" before "this step". In the embodiment, there is one major feature of the embodiment as a detailed method of realizing this process which is performed such that a "power corresponding to the target distance is provided at the specific region 12", a "power is added to the specific region 12", and a "near power at the near region 11 is common before and after the addition of the additional power". In the prescription power, the spherical power and the addition power for a specific distance (a far distance or an intermediate distance) are usually set. That is, the near power obtained by adding the spherical power and the addition power (the prescription value) to each other cannot be easily changed by the maker of the lens 1. For that reason, a condition that the "near power is common before and after addition" is needed. Additionally, the contents that the "near power is common before and after addition" include a case where the near power is constant before and after the addition of the additional power and a case where only a slight variation occurs at a level in which no problem occurs when the lens passes over to the wearer's hand even when the near power slightly changes before and after the addition of the additional power.

Based on the above-described relation, the power added to the specific region 12 is calculated. An outline of the calculation will be described with reference to FIG. 3. FIG. 3 is a graph illustrating a relation between an actual power and a distance on a main line of sight. A solid line indicates the lens 1 before the addition of the power to the specific region 12 and a broken line indicates the lens 1 after the addition of the power to the specific region 12.

Here, the lens (the solid line) before the addition of the power to the specific region 12 will be mainly described. The additional power ADD(F) is added to the specific region 12 (the intermediate distance) in the lens 1 (the broken line) after the addition of the power to the specific region 12.

Meanwhile, the lens 1 (the broken line) after the addition of the power to the specific region 12 will be mainly described. The addition power of the lens 1 (the broken line) after the addition of the power to the specific region 12 corresponds to a difference (that is, ADD−ADD(F)) between the power of the specific region 12 and the near power of the near region 11. When the addition power is multiplied by $\beta$ in the case of the normalization, it is possible to calculate the addition power to a "predetermined part (a position of 2.5 mm below the fitting point) on the lens 1" before the step of determining the power added to the specific region 12 which is the present step. That is, the addition power corresponds to a value of $\beta*(\text{ADD}-\text{ADD}(F))$.

As a result, as illustrated in FIG. 3, the following formula is established.

$$\text{ADD}(\text{target})=\text{ADD}(F)+\beta*(\text{ADD}-\text{ADD}(F)) \quad \text{(Formula 4)}$$

When (Formula 4) is summarized to obtain the additional power ADD(F) to the specific region 12, the following formula is obtained.

$$\text{ADD}(F)=(\text{ADD}(\text{target})-\beta*\text{ADD})/(1-\beta) \quad \text{(Formula 5)}$$

The additional power ADD(F) which is added in response to the ratio ACCratio of the accommodative power used by the wearer at the target distance changes. Here, the ratio ACCratio of the accommodative power when the wearer sees an object at the target distance will be described. That is, a case will be exemplified in which ACCratio is proportional to ADD(target) at a position on the lens corresponding to the target distance.

In this case, the following formula is established.

$$\text{ACCratio}=\text{ACCN-ratio}*\text{ADD}(\text{target})/\text{ADD} \quad \text{(Formula 6)}$$

Here, when a formula of $\gamma=\text{ACCratio}/\text{ACCN-ratio}$ is set, a formula of $\text{ADD}(\text{target})=\gamma\text{ADD}$ is obtained and thus the following formula is established.

$$\text{ADD}(F)=\text{ADD}*(\gamma-\beta)/(1-\beta) \quad \text{(Formula 7)}$$

A detailed calculation example using a detailed numerical value in the above-described case is illustrated as follows. Here, the following condition settings are used.

D(target)=1.25 D (80 cm)
D(N-target)=2.5 D (40 cm)
ADD=2.00 D
ACC=1.00 D
ACCN-ratio=0.5
β=0.363

As a result, first, ACCratio becomes 0.25 from (Formula 3) and (Formula 6) and γ becomes 0.5. As a result, ADD(F) becomes 0.43 D from (Formula 7).

That is, according to the above-described assumption, when the power added to the specific region 12 is set to 0.43 D, it is possible to appropriately see an object at a distance of 80 cm without any discomfort at a predetermined part (a position of 2.5 mm below the fitting point) on the lens 1 when the wearer sees a computer through the lens 1.

Further, there is no need to separately set the additional power and the power provided at a position corresponding to the target distance.

Specifically, in Patent Literature 1, the additional power is reliably provided at the distance part. However, since the power provided at a position corresponding to the target distance is not originally described, there is a need to separately set the powers even when a predetermined power is provided at a position corresponding to the target distance. Then, much time is spent for an optical design. It is possible if glasses are manufactured for individuals. However, it is not realistic to spend a lot of time on optical design if there are orders from all over the world.

Meanwhile, when the above-described method is used, a power provided at a position corresponding to the target distance is determined and the additional power can be naturally derived if the other parts (the base design or the addition power (the prescription value)) are given. Since this promotes the facilitation of the optical design, it is possible to promptly provide the lens 1.

Further, the lens 1 which is designed as described above is provided so that the prescription power can be usually distinguished by a prescription or a lens bag. It is possible to determine whether the commercially available lens 1 belongs to the technical scope of the lens 1 according to the embodiment by examining whether the power measured at the measurement reference point of the specific region 12 exceeds the prescription power. In other words, the lens 1 of the embodiment can be specified at one time by the above-described content. Regarding a predetermined part of the intermediate region 13 corresponding to the target distance, a description for the predetermined part and the target distance usually exist at a specification or a bag of the lens 1 as long as the target distance is set and the lens 1 of the embodiment can be specified by the above-described contents at one time. In addition, the position of the fitting point or the measurement reference point can be usually distinguished from a hidden mark stamped on the lens 1.

Regarding a specific processing (grinding, polishing, coating, etc.) for the lens 1 designed by the above-described method until the lens is fitted into an eyeglass frame, a known method may be used. Therefore, although the above-described contents have been described as the method of designing the lens 1, this embodiment has an aspect as a method of manufacturing the lens 1 by the combination of detailed processing which are known methods.

FIG. 4 is a graph illustrating a relation between an actual power and a distance on a main line of sight in each of the lenses constituting the lens group manufactured by the above-described method. In FIG. 4, a solid line indicates a perspective lens when the specific region 12 is the distance region, a broken line indicates an occupational lens when the specific region 12 is the intermediate distance region, and a dashed line indicates the close-up lens when the specific region 12 is the near distance region (a distance farther than a distance corresponding to the near region 11).

Referring to FIG. 4, the near power and a power at a specific position (a fitting point) of the intermediate region 13 corresponding to the target distance are respectively common at the lens constituting the lens group. Then, a power is added to the specific region 12 in the occupational lens (indicated by the broken line) and the close-up lens (indicated by the dashed line). As a result, in the occupational lens (indicated by the broken line) and the close-up lens (indicated by the dashed line), a power increase degree from the specific region 12 toward the near region 11 is suppressed and an astigmatism decreases. Accordingly, a comfortable visual field can be obtained.

Figure 5:
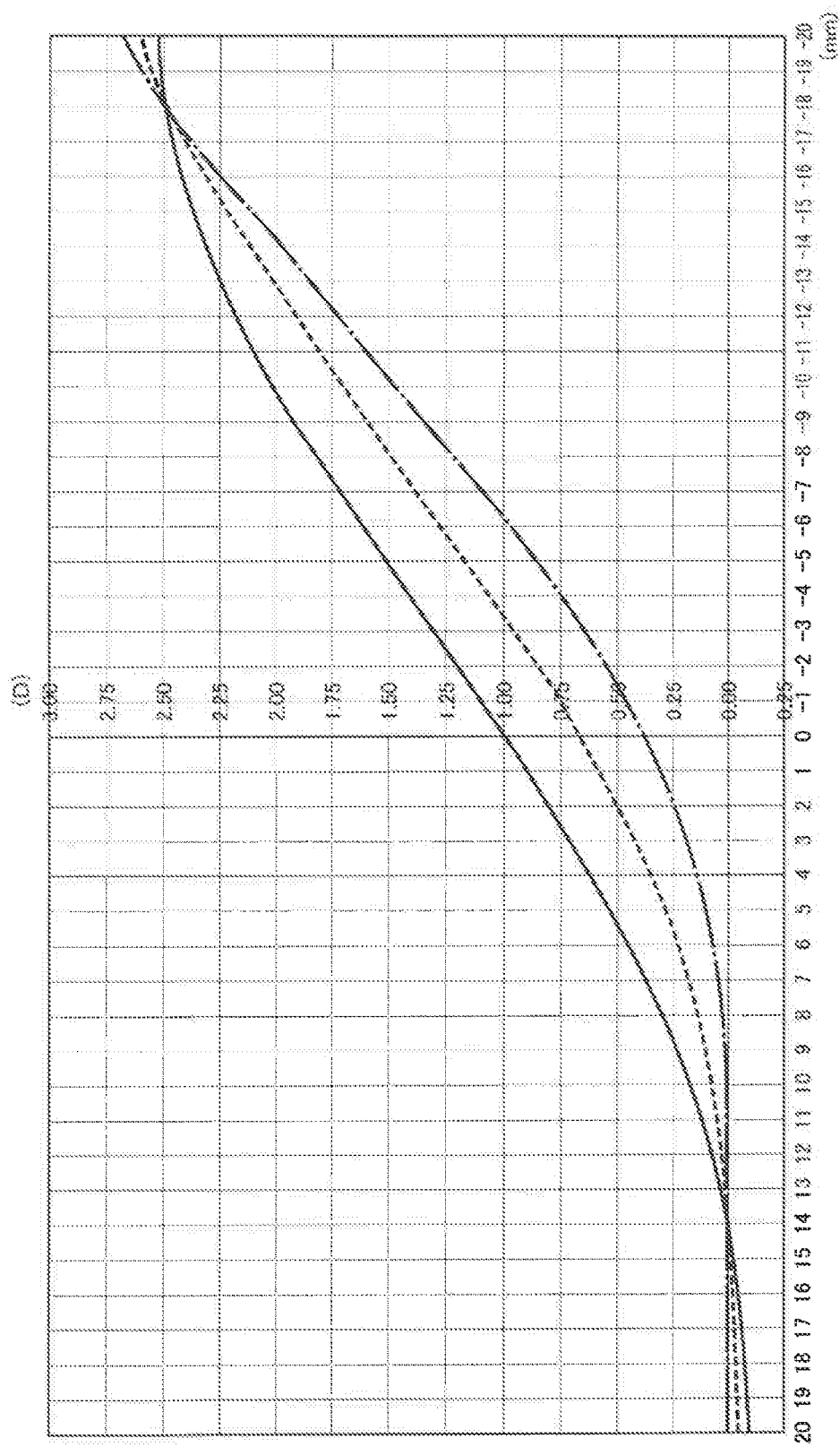
FIG. 5 is a graph illustrating a relation between a distance on a main line of sight and an actual power and illustrating a base design of each of progressive power lenses before the addition of the power to each of the progressive power lenses illustrated in FIG. 4.

Additionally, FIG. 5 is a graph illustrating a base design of each of the lenses before the power is added to the lenses illustrated in FIG. 4 and illustrating a relation between an actual power and a distance on a main line of sight. As illustrated in FIG. 5, the lens constituting the lens group of the embodiment may be designed (manufactured) on the basis of different base designs. In that case, a power change state is different at the intermediate region 13.

<4. Effect of Embodiment>

According to the embodiment, since there is no need to change the ordinary posture before the replacement of the lens 1, for example, when the wearer performs an operation using a computer (that is, the wearer performs an operation while seeing an object at a predetermined distance) as long as a different lens is selected from the same lens group when the wearer uses the lens 1 included in the lens group according to the embodiment, it is possible to perform an operation in a comfortable posture.

In addition, there is a degree of freedom except for two powers, that is, the near power and the power at a specific position inside the intermediate region 13 corresponding to the target distance in the lens group and the lens group according to the embodiment can include any one of the perspective lens, the occupational lens, and the close-up lens or a combination thereof.

As a result, it is possible to promptly provide the appropriate lens 1 in response to an individual which is a wearer when a different lens is selected in the same lens group in addition to the effect of obtaining the above-described "comfortable posture".

<5. Modified Example>

The inner surface progressive lens has been described in the embodiment, but the invention can also apply to an outer surface progressive lens of which the outer surface 2 is a progressive surface and the inner surface 3 is a spherical surface or a toric surface, a progressive lens of which both surfaces are progressive surfaces, or a progressive power lens having the other shapes.

In the embodiment, a case has been described in which the specific region 12 is the intermediate region, but the specific region 12 may be the distance region. More specifically, the specific region 12 may be a region for a distance where no problem arises even at a near distance slightly farther than a distance set in the near region 11. A lens corresponding to this case is a progressive power lens which is called as a close-up lens. In the lens 1, the wearer performs an operation while a main line of sight is usually directed to the near region 11 and is sometimes directed to the target distance (a secondary distance). Additionally, even in such a close-up lens, when the near region 11 is treated as a main region (that is, when the target distance and the distance corresponding to the near region 11 are changed) while a part on the lens 1 corresponding to the target distance is treated as a sub-region, any problem can be sufficiently covered by the technical spirit of the invention.

In the embodiment, a case has been described in which the target distance is a limited distance corresponding to a position below the fitting point in the lens 1. Meanwhile, the target distance may be an upper or lateral position of the fitting point. As an example, as a case of using the upper position of the fitting point in the lens 1, there is a lens 1 which is used by a person who needs to look at the upside to perform a work on a signboard. As a case of using the lateral position, there is a lens 1 which is used by a person who checks left and right cargos while walking along a corridor in a warehouse.

In the embodiment, a predetermined part of the intermediate region 13 in the lens corresponding to the target distance is set to a position of 2.5 mm below the fitting point. Meanwhile, the fitting point may become the predetermined part in the step of finally fitting the lens into the eyeglass frame. Additionally, Patent Literature 1 describes a method of obtaining a predetermined power at the fitting point by the additional power, but the concept of respectively setting the near power and the power corresponding to the target distance to be common in the lens group is not disclosed.

Second Embodiment

In the above-described embodiment, an example has been described in which the addition power (the prescription value) is set after the accommodative power of the wearer is added to the lens 1 and then the accommodative power of the wearer is added even when the "additional power" is set.

Meanwhile, in the embodiment, a case in which the accommodative power of the wearer is added when the addition power (the prescription value) is determined and the accommodative power of the wearer is not applied when the "additional power" is set (specifically, a case of ACCratio=0) or a case in which ACCratio is constant, different from the above-described embodiment, will be described.

Since ADD(target)=D(target) of (Formula 3) is established in the case of ACCratio=0, (Formula 5) is obtained as the following formula.

$$ADD(F) = (D(\text{target}) - \beta * ADD)/(1-\beta) \quad \text{(Formula 8)}$$

In this case, when ADD which is the addition power (the prescription value) increases, the addition amount of the additional power ADD(F) decreases.

A detailed calculation example using a detailed numerical value in the above-described case is illustrated as follows. In addition, the same condition as that of the above-described embodiment is used except for the condition of ACCratio=0. As a result, a formula of ADD(F)=0.823 D is obtained from (Formula 8).

In a case where ACCratio is constant, that is, a relation of ACCratio=ACCN-ratio is established, the accommodative power is used at the high ratio similarly to a case where an object at the near distance is seen even when the wearer sees an object at the target distance. From the description of FIG. 3, the following relation is obtained.

$$D(N\text{-target}) = ADD + ACC * ACCN\text{-ratio} \quad \text{(Formula 9)}$$

When (Formula 5) of ADD(F) is summarized using ACCratio=ACCN-ratio which is an assumption of this formula, the following formula is obtained.

$$ADD(F) = (D(\text{target}) - D(N\text{-target}))/(1-\beta) + ADD \quad \text{(Formula 10)}$$

A detailed calculation example using a detailed numerical value in the above-described case is illustrated as follows. In addition, a condition is the same as that of (Case 1) except for the condition of ACCratio=ACCN-ratio. As a result, ADD (F)=0.038 D is obtained from (Formula 10).

Additionally, the "accommodative power" may be appropriately set in response to the accommodative power of the wearer. For example, when the accommodative power of the wearer is smaller than 0.25 D, a process of setting the accommodative power to 0.25 D may be performed. In contrast, when the accommodative power of the wearer is large, the accommodative power may be set to (2.75-ADD). In addition, in the case of ADD≤2.5 D of the embodiment, the accommodative power is obtained by this formula.

Such a lens 1 may be included in the lens group of the embodiment.

While the embodiments of the invention have been described, the invention is not limited to the above-described embodiments and can be modified into various forms without departing from the spirit of the invention.

REFERENCE SIGNS LIST

1: progressive power lens
11: near region
12: specific region
13: intermediate region
2: outer surface
3: inner surface

The invention claimed is:
1. A progressive power lens group comprising:
a plurality of progressive power lenses including
  a near region for seeing an object at a near distance,
  a specific region for seeing an object at a far distance in relation to the near distance, and
  an intermediate region provided as a region between the specific region and the near region and having a power progressing from the specific region toward the near region,
wherein a near power at the near region is common in the plurality of progressive power lenses,
a power corresponding to a predetermined target distance which is a distance between the near distance and the far distance is provided at a predetermined part of the intermediate region, and
a setting position of the predetermined part of the intermediate region is common to the plurality of progressive power lenses.
2. The progressive power lens group according to claim 1, wherein
one lens of the plurality of progressive power lenses has a different power at the specific region.
3. The progressive power lens group according to claim 2, wherein
in at least one of the plurality of progressive power lenses, a power exceeding zero is added to a prescription power of the specific region so that the power corresponding to the predetermined target distance is provided at the predetermined part of the intermediate region.
4. The progressive power lens group according to claim 1, wherein
in at least one of the plurality of progressive power lenses, a power exceeding zero is added to a prescription power of the specific region so that the power corre- sponding to the predetermined target distance is provided at the predetermined part of the intermediate region.

5. The progressive power lens group according to claim 4, wherein
the power (ADD(F)) added to the prescription power is expressed by the following formulae:

$$ADD(F) = (ADD(target) - \beta * ADD)/(1-\beta)$$

$$ADD(target) = D(target) - ACC * ACCratio$$

where
ADD denotes an addition power (the prescription power) of the progressive power lens,
D(target) denotes a power corresponding to a target distance,
ADD(target) denotes an additional power for the prescription power provided at the predetermined part of the intermediate region and is obtained by subtracting an adjustment amount necessary for a wearer to see the object at the target distance from D(target),
$\beta$ denotes an addition ratio of the predetermined part of the intermediate region before the addition of ADD(F),
ACC denotes an accommodative power of the wearer or a fixed value obtained in consideration of the accommodative power, and
ACCratio denotes a ratio used for the wearer to see the object at the target distance in the accommodative power of the wearer.

* * * * *